(12) United States Patent
Watson

(10) Patent No.: US 6,241,603 B1
(45) Date of Patent: Jun. 5, 2001

(54) VENTILATION FILTER MECHANISM

(76) Inventor: Ronald Watson, 1441 S. Camino Arriba, Tucson, AZ (US) 85713

(*) Notice: Subject to any disclaimer, the term of this patent is extended or adjusted under 35 U.S.C. 154(b) by 0 days.

(21) Appl. No.: 09/503,684

(22) Filed: Feb. 14, 2000

Related U.S. Application Data

(60) Provisional application No. 60/120,362, filed on Feb. 16, 1999.

(51) Int. Cl.$^7$ .................................................. F24F 3/16
(52) U.S. Cl. ........................... 454/284; 55/505; 454/307; 454/313; 454/320
(58) Field of Search ................................. 454/284, 289, 454/290, 307, 313, 320, 309; 55/505, DIG. 37, 473

(56) References Cited

U.S. PATENT DOCUMENTS

| Re. 35,236 | * | 5/1996 | Nolen, Jr. ................................. 95/55 |
| 450,322 | * | 4/1891 | Segal ................................. 454/289 X |
| 1,801,949 | * | 4/1931 | Broudy et al. . |
| 1,975,686 | * | 10/1934 | Froelich ................................. 454/307 |
| 2,222,081 | * | 11/1940 | Leigh ................................. 454/309 X |
| 4,313,560 | * | 2/1982 | Stiles . |
| 5,525,145 | * | 6/1996 | Hodge ................................. 454/309 X |
| 5,720,660 | * | 2/1998 | Benedetto et al. ................... 454/289 X |
| 5,863,310 | * | 1/1999 | Brown et al. ............................ 55/480 |
| 5,947,815 | * | 9/1999 | Danforth ................................. 454/289 |

* cited by examiner

Primary Examiner—Harold Joyce
(74) Attorney, Agent, or Firm—Mark E. Ogram; Gavin J. Milczarek-Desai

(57) ABSTRACT

A filtering system which is secured to a traditional air register. The filter uses a flange adapted to encircle the outlet of the traditional air register. Connected to the flange is an air filtering material which collects the dust and pollen at the air register, before the air enters the room. In one embodiment of the invention, an electro-static charge is used by the filtering material to assist in the collection of the dust and pollen. To assist the user in determining when the filter system should be replaced, the air flow pushes a flag; hence as the air flow decreases as the filter becomes clogged, the location of the flag notifies the user that the air filter system should be replaced. While a hook-and-loop fastener is sometimes used to secure the filter to the air register, the preferred embodiment uses a releasable adhesive.

18 Claims, 5 Drawing Sheets

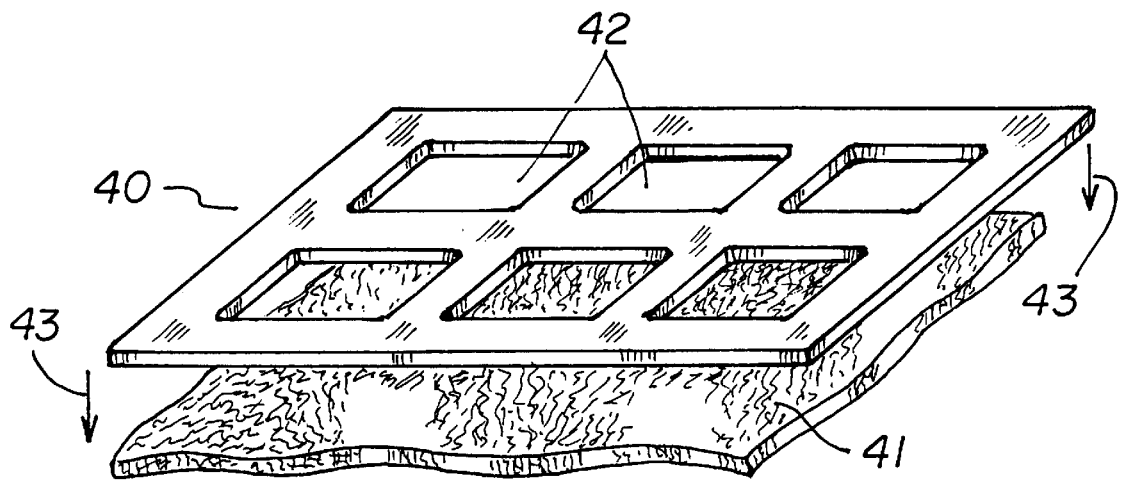
FIG. 4
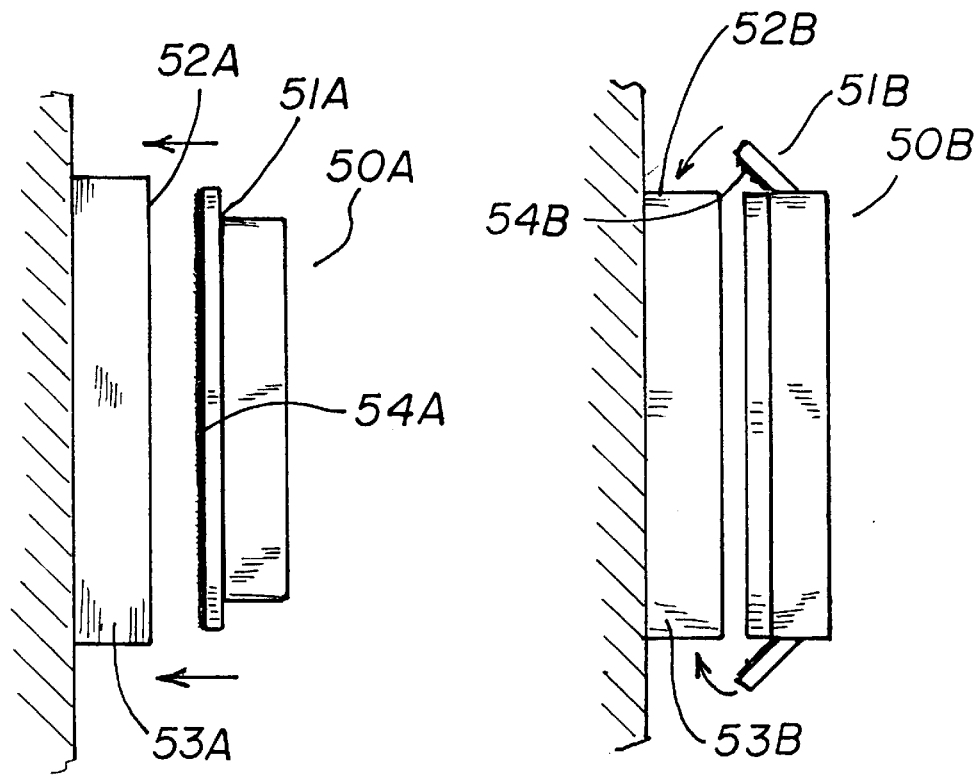
FIG. 5A
FIG. 5B

VENTILATION FILTER MECHANISM

Priority for this application is claimed from provisional patent application number 60/120,362, filed on Feb. 16, 1999, and entitled "Ventilation Filter Mechanism".

BACKGROUND OF THE INVENTION

This invention relates generally to ventilation systems and more particularly to those which utilize wall vents commonly used in residences.

The quality of ambient air conditions continues to deteriorate. The is vastly more pollutants and dust in the air today than there was only fifty years ago. These pollutants find their way into our dwellings and offices, and then into our lungs.

While air conditioning does assist in removing a large percentage of air-borne pollutants and dust, some still is communicated through the duct system into the living space.

Of even more concern is the use of evaporative coolers which rely upon exterior air and an air flow through the dwelling in order to cool the room. By drawing in the ambient air, the evaporative cooler also draws in the pollutants and dust and sent it to the resident via the ducts.

While the pollutants and dust, in most situations, merely increase the number of times that the room must be cleaned, for a great many people the pollutants and dust are not just an irritant but also diminish the quality of life that the resident enjoys. People with asthma, allergies, and a host of other respiratory problems often cannot live in a house cooled by an evaporative cooler.

To help diminish the negative health affects of evaporative coolers, often an in-line filter is used. While this filter does reduce the pollutants and dust delivered, typically the filter is placed near the evaporative cooler (usually at an inconvenient place) and/or is of such large mesh that it doesn't assist those with more pronounce respiratory problems.

It is clear that there is a need for an easy to use apparatus to cleanse the air being delivered to a residence.

SUMMARY OF THE INVENTION

The present invention creates a filtering system which is secured to a traditional air register. In this context, the air register uses the accepted meaning, a grating over an air duct used to direct air-flow from the air duct.

The filter of this invention uses a flange adapted to encircle the outlet of the traditional air register. The air register usually has a shoulder area; it is this area where the filter is secured. For air registers which do not have a shoulder, the side walls are used to secure the filter.

Connected to the flange is an air filtering material which collects the dust and pollen at the air register, before the air enters the room. In this context, the flange (and sometimes an housing for the filter material) positions and secures the filter within the air flow from the air register. The air from the air register must pass through the filter, thereby cleaning the air before it ever enters the room.

In one embodiment of the invention, an electro-static charge is used by the filtering material to assist in the collection of the dust and pollen. Those of ordinary skill in the art readily recognize a variety of mechanisms to provide this electro-static charge, including, but not limited to, the techniques described in U.S. Pat. No. 5,726,107 issued on Mar. 10, 1998, to Dahringer and entitled "Non-wovens of electret fiber mixtures having an improved charge stability", and, U.S. Pat. No. 4,473,474, issued to Ostreicher on Sep. 25, 1984, and entitled "Charge modified microporous membrane, process for charge modifying said membrane and process for filtration of fluid", both of which are incorporated hereinto by reference.

In some embodiments of the invention, the use of a substrate to support the filtering material is employed. The substrate is ideally a "checkered" pattern which provides the support through the creation of small windows.

In the preferred embodiment of the invention, the filter material traps particulate matter which is greater than ten microns in size. Such filter material is commercially available from Fiberbond Corporation under the trademark of DUSTLOK or SPOR-AX.

Once in place, the filter collects dust and pollen to protect the user. To assist the user in determining when the filter system should be replaced, the air flow pushes a flag; hence as the air flow decreases as the filter becomes clogged, the location of the flag notifies the user that the air filter system should be replaced.

The air flow flutters the flag at varying heights depending upon the force of the air flow. In one embodiment of the invention, the top of the flag is one color (say red) while the bottom of the flag is another color (say blue). The user is able to visually check the flag, if the blue color is visible (indicating that the flag is being pushed upward by the air flow) then the filter is not clogged; but, if the visible color is red, the user knows that the air flow is being curtailed by the clogging of the filter and that the filter needs to be replaced.

The use of color indicia on the flag is only one technique. Another technique is to provide written instructions such as "OPERATING" and "REPLACE" on the two sides of the flag.

The filter should be easily secured to the air register and also easily removed when it must be replaced. While a hook-and-loop fastener is sometimes used to secure the filter to the air register, the preferred embodiment uses a releasable adhesive. Those of ordinary skill in the art readily recognize a variety of adhesives which will work in this context.

In this manner, the present invention provides for a filter which is affixable to an exterior portion of a ventilation register. Ideally, no tools are used to affix the filter; thereby, allowing the filters to be easily applied and changed.

In the preferred embodiment, the filters have adhesive backed wings which are secured to the periphery of the registers face and side walls. Once properly secured to the register, all of the air flow must pass through the filter in order to enter the room.

Since individual registers are covered by the filters, a variety of filters having different properties are provided. This allows the filtration process to be as coarse or fine as the resident requires. As example, in a bedroom where a person with pronounce respiratory conditions lives, the filtering of the air flow is comparable to a HEPA filter; while in another room, the filtration removes only suspended dust particles.

In some embodiments of the invention, the filters are secured to the register using a hook-and-loop attachment mechanism. In this embodiment, a hook component of the fastener is affixed to the periphery of the register while the loop component of the fastener is provided with the filter.

Ideally the filters are manufactured to be disposable and are flame retardant. Also, ideally the filters do not contain any glass fibers which could be entrained in the air-flow and inhaled by the occupants.

In one embodiment of the invention, a cardboard grating is provided for the user to apply on the outside of the filter. This cardboard grating has adjustable louvers so that the user is able to direct the flow of air exiting the filter towards various locations with the room.

The invention, together with various embodiments thereof, will be more fully explained by the accompanying drawings and the following description.

DRAWINGS IN BRIEF

FIG. 4 is a perspective view of an embodiment of the filter using a supporting substrate.

FIGS. 5A and 5B illustrate two embodiments for fastening the air filter of this invention to an air register.

DRAWINGS IN DETAIL

Figure 1A:
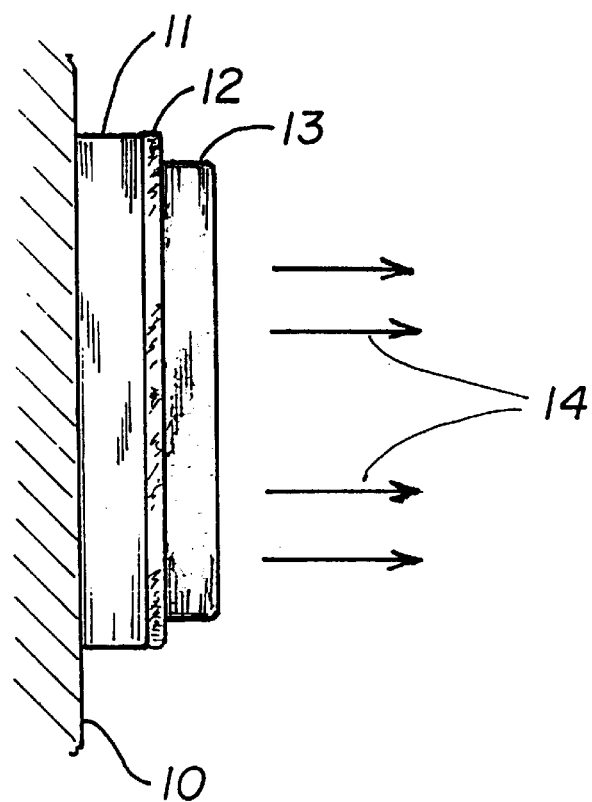
FIG. 1A is a side view of the preferred embodiment of the invention.

FIG. 1A is a side view of the preferred embodiment of the invention.

Attached to wall 10 is register 11. Register 11 is secured to the wall in the traditional manner of screws. Filter 13 has an adhesive flap 12 as a part thereof Adhesive flap 12 has a releasable adhesive thereon permitting adhesive flap 12 to be secured to register 11; and removed later when filter 13 has served its useful life.

In this manner, airflow 14 is further filtered before it enters the room.

Figure 1B:
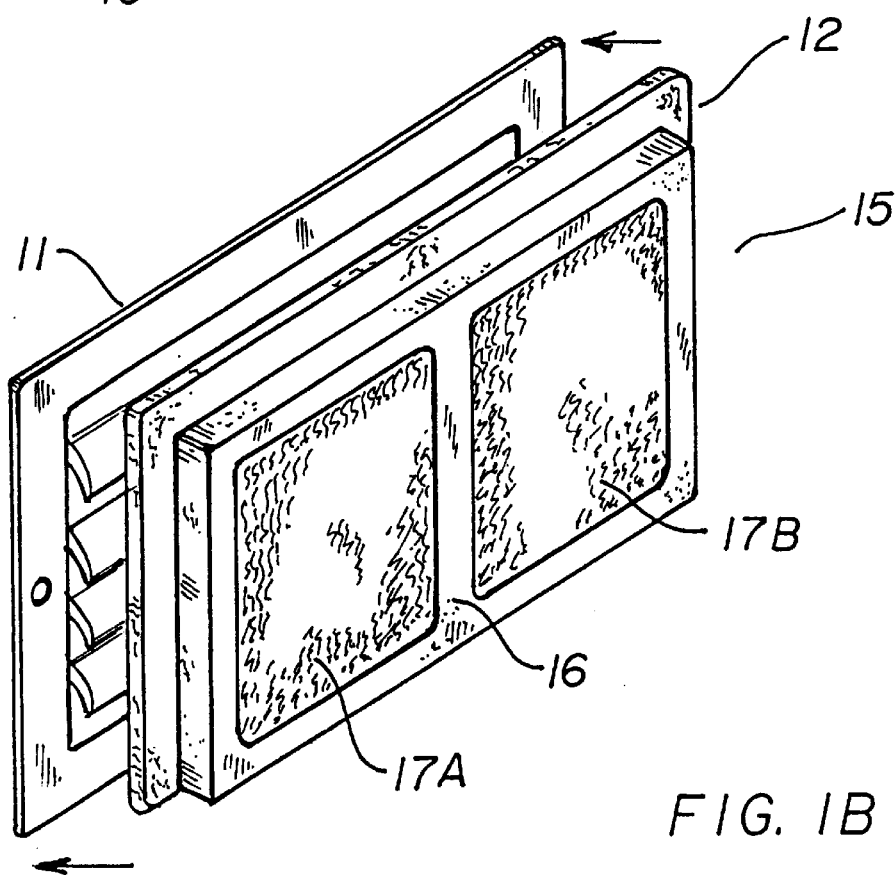
FIG. 1B illustrates the placement of filter assembly 15 against register 11.

FIG. 1B illustrates the placement of filter assembly 15 against register 11.

On the back of adhesive flap 12 is a mild adhesive permitting adhesive flap 12 to secure the filter assembly 15 to register 11. Filters 17A and 17B (actually one unit in this embodiment) are held in place by frame 16.

Ideally frame 16 and adhesive flap 12 are made of paper or light cardboard. Filters 17A and 17B are chosen from a wide variety of filtering materials well known to those of ordinary skill in the art. Because of the materials chosen, in the preferred embodiment, filter assembly 15 is disposable.

Figure 2:
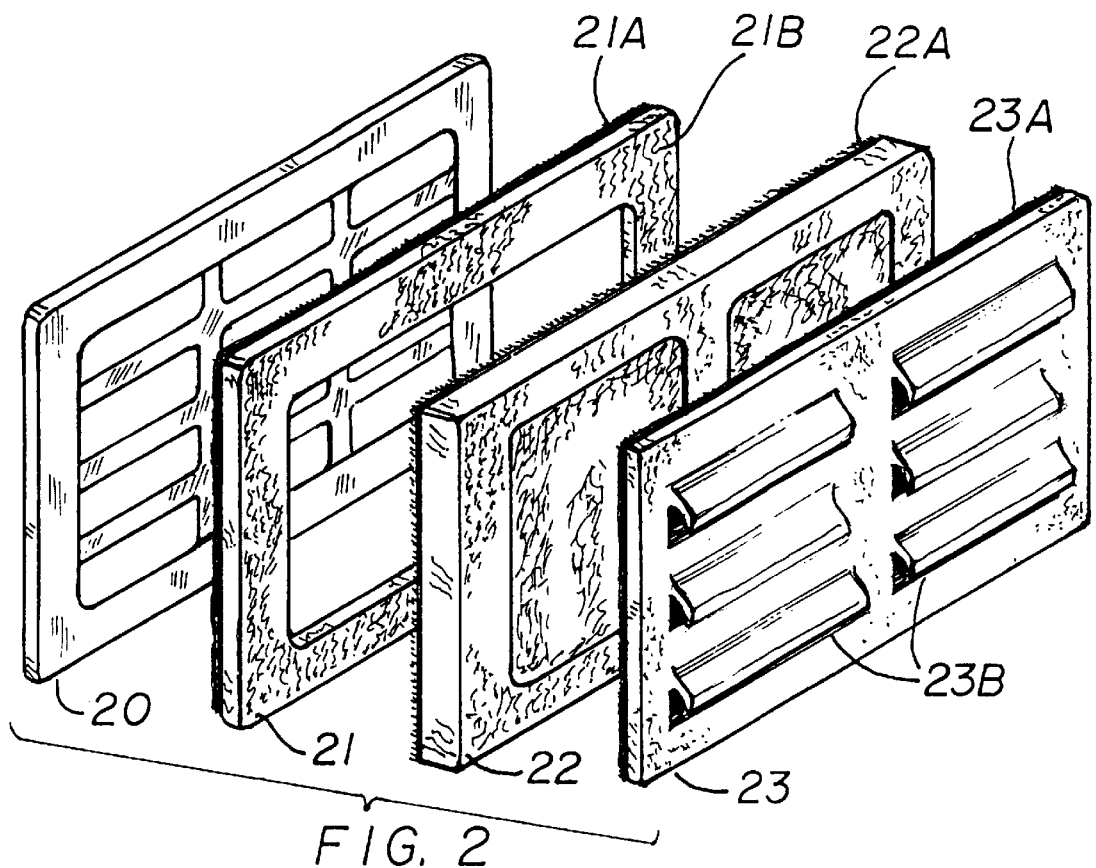
FIG. 2 is an exploded view of an alternative embodiment of the invention.

FIG. 2 is an exploded view of an alternative embodiment of the invention.

Over the rim of register 20 is placed ring 21. On one side of ring 21 is adhesive 21A which secures ring 21 to register 20; on the opposing side of ring 21 is a first component of a hook-and-loop fastener 21B.

Over this assembly is placed filter 22. Around one edge of filter 22 is placed a second component of a hook-and-loop fastener 22A. The two components, 21B and 22A, secure the filter 22 to ring 21.

Over this assembly is placed cardboard grate 23 which is secured to filter 22 via adhesive 23A. Bendable windows 23B permit the user to direct the airflow as desired.

This embodiment is ideally sold as a kit comprised of: ring 21, filter 22, and cardboard grate 23. Later replacements of the filter are sold as a kit having only filter 22 and cardboard grate 23.

Figure 3:
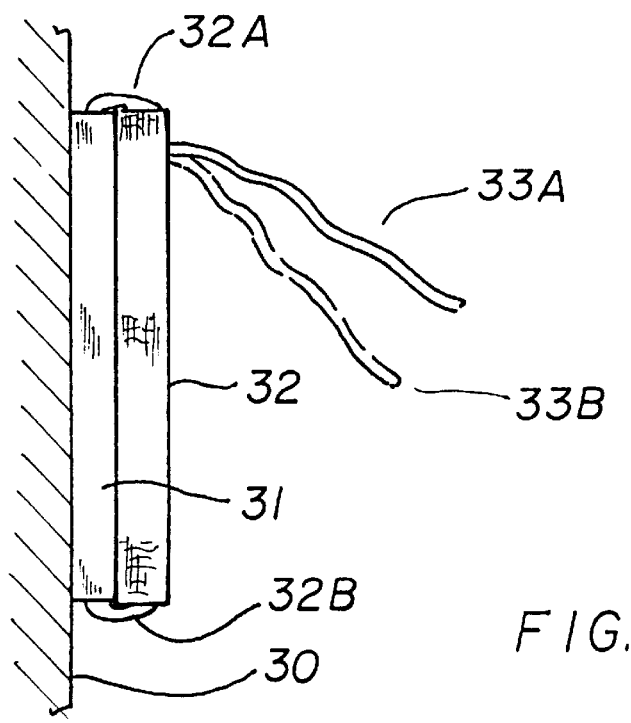
FIG. 3 illustrates an embodiment of the invention which includes an airflow gauge.

FIG. 3 illustrates an embodiment of the invention which includes an airflow gauge.

As before, register 31 is secured to the wall 30 and filter 32 is secured thereto. In this embodiment, filter 32 is secured to an edge portion of grate 31 using adhesive flaps 32A and 32B. These flaps do not fully encircle register 31 and a small rubber gasket, not shown, between filter 32 and register 31, assures that air entering the room must pass through filter 32.

To gauge when the filter is "full", vane 33A, a light piece of plastic, is pushed away from filter 32 by the airflow therethrough. As filter 32 catches more dust and pollutants, the airflow naturally diminishes and the vane is not pushed outward as far (as illustrated by vane 33B). In this manner, the user is able to readily determine when the filter needs to be changed.

FIG. 4 is a perspective view of an embodiment of the filter using a supporting substrate.

Substrate 40 has a number of windows 42 therein. Secured (as illustrated by arrows 43) to one side of substrate 40 is a filtering sheet 41. This combination then is used as a single unit to filter the air flow. Substrate 40 provides mechanical support for filtering sheet 41 so that it does not deform or wrinkle during use.

In one embodiment of the invention, substrate 40 has an electro-static charge placed on it to assist in the collection of dust and pollen. In another embodiment, it is the filtering sheet 41 which has the electro-static charge to provide for this collection purpose.

FIGS. 5A and 5B illustrate two embodiments for fastening the air filter of this invention to an air register.

Referring to FIG. 5A, air filter 50A is secured to the front of air register 53A along shoulders 52A of the air register 53A. Adhesive 54A along a face of flange 51A provides for a releasable adhesion of air filter 50A to air register 53A In FIG. 5B, an alternative embodiment is shown. Air filter 50B is secured along walls 52B of air register 53B. In this case, flange 51B is folded around walls 52B and adhered (via adhesive 54B) thereto.

Figure 6:
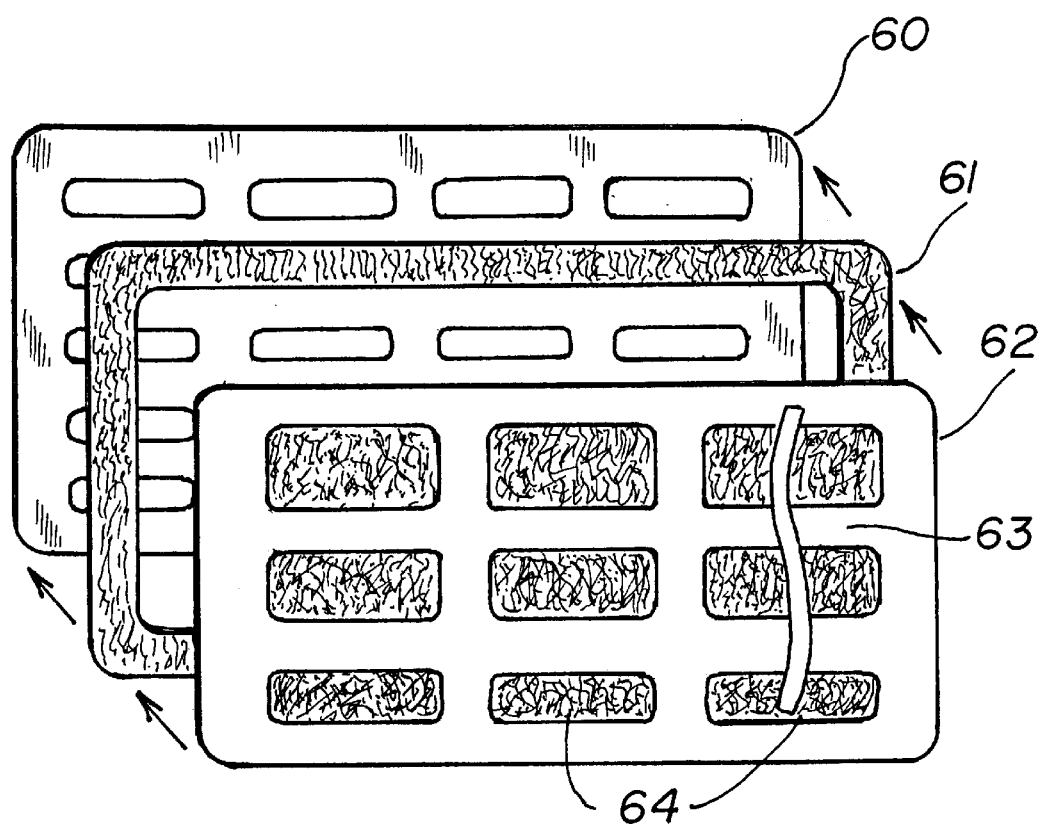
FIG. 6 illustrates the use of a hook-and-loop mechanism for securing the air filter to the air register.

FIG. 6 illustrates the use of a hook-and-loop mechanism for securing the air filter to the air register.

A hook-and-loop (such as VELCRO) ring 61 is first attached to the rim of air register 60. Ring 61 will not be removable but serves as a basis for securing air filter 62 thereto. Another ring of hook-and-loop material (not visible in this illustration) is positioned on the back of air filter 62 allowing air filter 62 to be easily secured/removed from the hook-and-loop ring 61 attached to air register 60.

In this illustration, the position of flag 63 is shown as it extends over the outlet from air filter 62. Also visible in this illustration is the air filtration material 64.

Figure 7A:
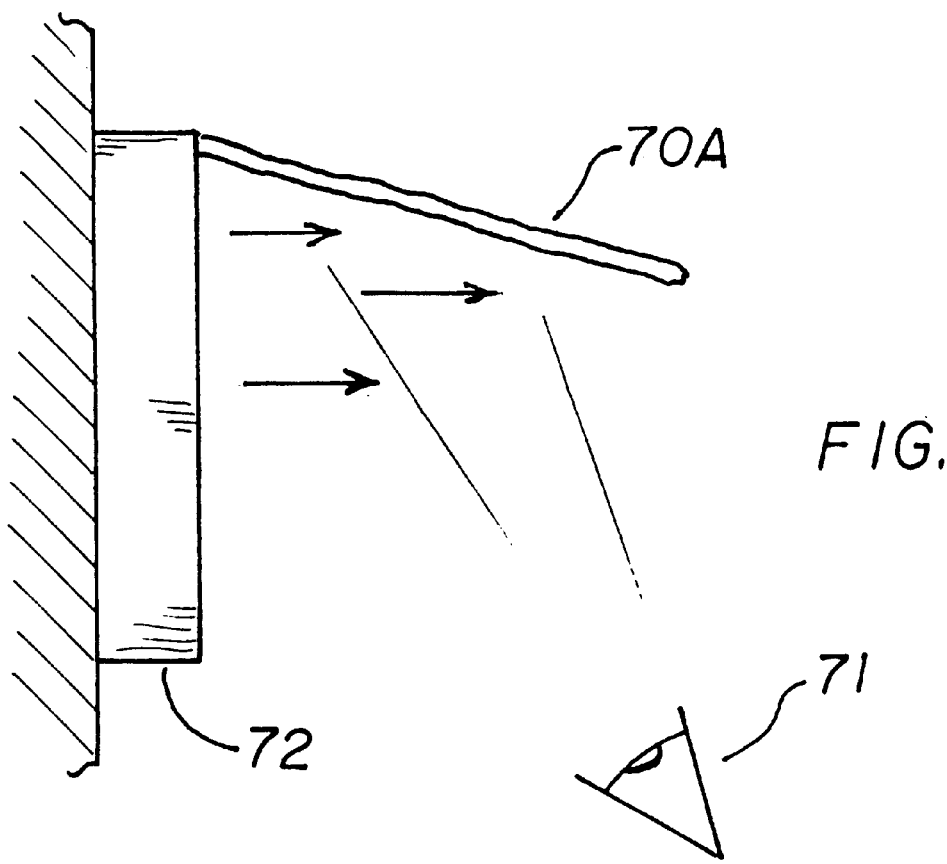
FIGS. 7A and 7B illustrate the use of the flag to visually determine when the air filter needs to be replaced.
Figure 7B:
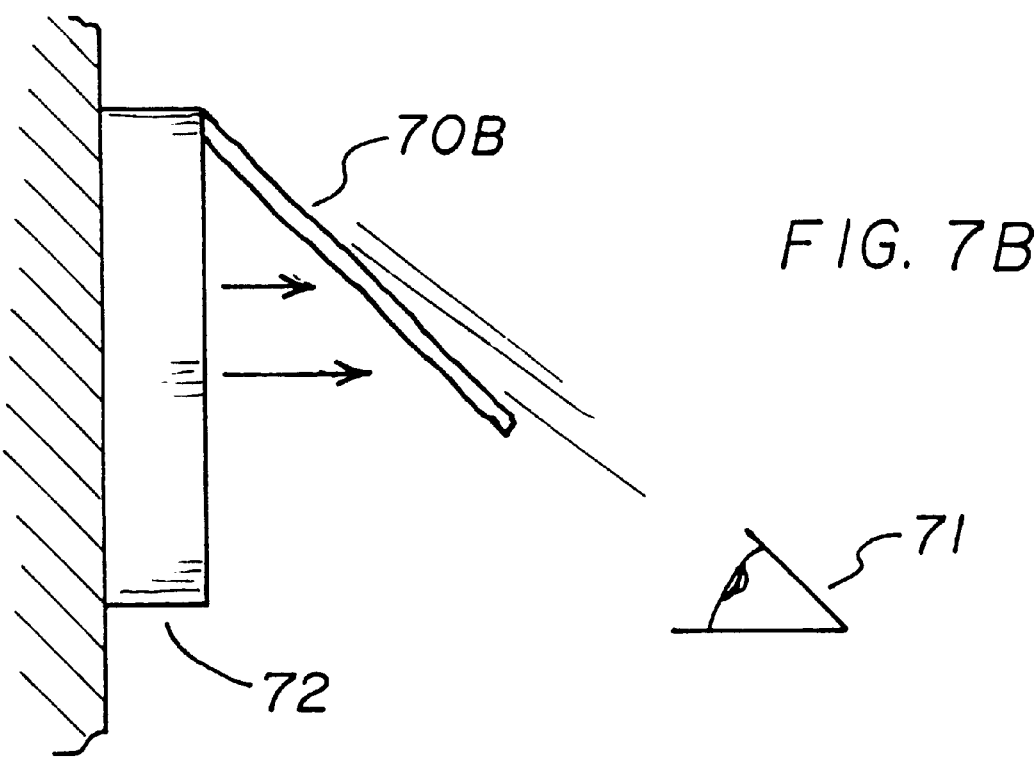

FIGS. 7A and 7B illustrate the use of the flag to visually determine when the air filter needs to be replaced.

Referring to FIG. 7A, air flow through air filter 72 pushes the flag to position 70A. When viewed from below, user 71 sees the underside of flag 70A. This underside portion has been colored to indicate that the air filter 72 does not need to be replaced.

As air filter 72 becomes "clogged", as illustrated in FIG. 7B, the air flow therethrough is much less and the flag "droops" to position 70B. When user 71 now views the flag, the upper side of the flag is more visible. The color on the upper side of the flag is different than the underside, thereby informing the user that air filter 72 needs to be replaced.

It is clear that the present invention creates a highly versatile apparatus capable of cleansing air being delivered to a residence through a duct system

What is claimed is:

1. A filtering system comprising:
   a frame having at least one opening therethrough and a flange, wherein the flange is adapted to be secured to an air register such that said flange encircles an outlet of said air register,
   an air filtering material contained within said frame such that when said flange is secured to said air register, air flow from said air register must flow through said air filtering material to enter a room serviced by said air register; and
   a register mechanism securable to an exterior surface of said frame, said register mechanism being manually manipulated by a user to direct a flow of air into said room.

2. The filtering system according to claim 1, further including a flag secured to an exterior surface of said frame such that air flow through said air filtering material causes said flag to rise.

3. The filtering system according to claim 2, wherein a first surface of said flag contains an indicia different than an indicia on a second surface of said flag.

4. The filter system according to claim 3, wherein said first surface is a different color than the second surface of said flag.

5. The filtering system according to claim 1, further including an adhesive placed on said flange for securing said flange to said air register.

6. The filtering system according to claim 5, wherein said adhesive is weak enough to allow manual removal of said flange from said air register.

7. The filtering system according to claim 1, further including:
   a) a first unit of hook-and-loop fastener securable to said air register; and,
   b) a second unit of hook-and-loop fastener secured to said flange, said second unit of hook-and-loop fastener adapted to mate with said first unit of hook-and-loop fastener.

8. The filtering system according to claim 1, wherein said flange is configured to encircle a perimeter wall of said air register.

9. The filtering system according to claim 1, wherein said air filtering material includes:
   a) a supporting substrate; and,
   b) a filter sheet secured to said supporting substrate.

10. The filtering system according to claim 9, wherein said supporting substrate includes a permanent electro-static charge.

11. The filtering system according to claim 9, wherein said filter sheet includes an electrostatic charge.

12. An air filter comprising:
   a) a flange adapted to be secured to an air register such that said flange, when installed, encircles an outlet of said air register,
   b) an air filtering material secured to said flange such that when said flange is secured to said air register, air flow from said air register must flow through said air filtering material to enter a room serviced by said air register; and
   a flag secured to said flange, a first surface of said flag being predominantly a first color, a second surface of said flag being predominantly a second color.

13. The air filter according to claim 12, wherein said air filtering material includes:
   a) a supporting substrate; and
   b) a filter sheet secured to said supporting substrate.

14. The air filter according to claim 13, further including a releasable adhesive placed on said flange for securing said flange to said air register.

15. A filtering system comprising:
   a) an air register communicating air via an outlet therein into a room;
   b) a removable filter having:
      1) a flange adapted to encircle the outlet of said air register,
      2) an air filtering material secured to said flange,
      3) a register mechanism secured to said flange, said register mechanism being manually manipulated by a user to direct a flow of air passing through said air filtering material into said room,
      4) a flag secured to said register mechanism, said flag being responsive to air flow through said register mechanism, and,
      5) a releasable adhesive placed on said flange for securing said flange to said air register.

16. The filtering system according to claim 15, wherein said air filtering material includes:
   a) a supporting substrate; and
   b) a filter sheet secured to said supporting substrate.

17. The filtering system according to claim 16, wherein said supporting substrate includes an electro-static charge.

18. The filtering system according to claim 16, wherein said filter sheet includes an electro-static charge.

* * * * *